३,२२५,११९
THERMOPLASTIC COPOLYMER OF VINYL MONOMER AND CYANATE MONOMER
William P. Baker, Jr., Chadds Ford, Pa., assignor to E. I. du Pont de Nemours and Company, Wilmington, Del., a corporation of Delaware
No Drawing. Filed May 16, 1962, Ser. No. 195,318
13 Claims. (Cl. 260—874)

This invention relates to novel polymers and, more particularly, to copolymers of isocyanate monomers with vinyl monomers, preferably with vinyl monomers having conjugated unsaturation, e.g., styrene, butadiene, acrylonitrile and the like.

By "isocyanate monomers" are meant isocyanate and isothiocyanate monomers of the formula R—N=C=X wherein R is alkyl (1–18 carbon atoms), phenyl, biphenyl, alkylphenyl and X is a chalcogen (sulfur and oxygen). Such compounds include methyl, ethyl, propyl, isopropyl, butyl, hexyl, decyl, dodecyl, and stearyl, phenyl, chlorophenyl, methyl phenyl, chlorodiphenyl and biphenyl isocyanate or isothiocyanate.

It has been found that by copolymerizing isocyanate or isothiocyanate monomers with such polymers as polystyrene and the like so that the combination is in the form of a block copolymer, a great number of the properties of the basic polymer can be substantially improved. Thus, where polystyrene is brittle and inflexible, the copolymer of styrene and isocyanate or isothiocyanate monomer is tough and flexible. Besides greater flexibility and toughness, these polymers display improved tear strengths, impact strengths and tensile strengths.

The novel copolymers are produced by first preparing a catalyst solution; adding the solution to a purified vessel; adding, preferably, if possible, by vacuum distillation, at least one prepurified vinyl monomer under such conditions that cause the vinyl monomer to polymerize; and, thereafter, adding the isocyanate monomer under such conditions that cause copolymerization of the latter monomer with the polymer of the vinyl monomer, preferably to the extent that the isocyanate monomer represents 2–80 mole percent of the sum of moles of vinyl monomer and isocyanate monomer in the final copolymer.

VINYL MONOMERS

The preferred group of vinyl monomers for use in the present invention includes styrene, butadiene, isoprene, methyl methacrylate and acrylonitrile. However, the broad group includes esters of acrylic, methacrylic, and other α-substituted acrylic acids, including esters of α-cyanoacrylic acid, acrylonitrile, methacrylonitrile, and other α-substituted acrylonitriles, including vinylidene cyanide, styrene, ring-substituted styrenes, α-methylstyrene, ring-substituted α-methylstyrenes, vinyl pyridines, and methylene malonates.

In general, these monomers should be free of such groups as hydroxy, hydroxycarbonyl, thiol, imino, primary or secondary amino, amido, and the like, i.e., groups that contain an active hydrogen atom as determined by the Zerewitinoff test[1] carried out under the conditions employed for polymerization. The list of compounds includes, specifically, α-methylstyrene, p-methoxy-α-methylstyrene, p-methyl-α-methylstyrene, styrene, p-methylstyrene, p-chlorostyrene, 2,4-dimethylstyrene, m-ethylstyrene, m-isopropenylstyrene, or butadiene, isoprene, piperylene, or methyl, ethyl, propyl, isopropyl, butyl, isobutyl, sec-butyl, tert-butyl, amyl, 2-ethylhexyl, octyl, capryl, nonyl, 3,5,5-trimethylhexyl, dodecyl, hexadecyl, octadecyl, cyclohexyl, methylcyclohexyl, trimethylcyclohexyl, benzyl, phenyl, methallyl, crotyl, butenyl, undecenyl, oleyl, methoxyethyl, ethylthioethyl, butoxyethyl, ethoxyethoxyethyl, phenoxyethyl, benzoxyethyl, cyclohexoxyethyl, butoxypropyl, ethoxybutyl, terphenyl, phenylethyl, hexahydrobenzyl, tetrahydrobenzyl, tetrahydrofurfuryl, dicyclopentyl, dicyclopentenyl, methacrylate or acrylate, or 2-, 3-, or 4-vinylpyridine, or acrylonitrile, methacrylonitrile, α-phenylacrylonitrile, or dimethyl methylenemalonate, diethyl methylenemalonate, vinylidene cyanide, or methyl, ethyl, or butyl α-cyanoacrylate.

SOLVENTS

Various solvents can be employed for the polymerizations. They include benzene, toluene, xylene, the naphthas, ethers, such as diethyl ether, diisopropyl ether, dioxane, tetrahydrofurane, the dimethyl ether of ethylene glycol, dimethylformamide and dimethylacetamide. The important considerations in selecting the solvent are: they should be inert; they should have some affinity for the polymer formed; and they should not contain in their structure any active hydrogen atoms as determined by the Zerewitinoff test carried out under the conditions employed for polymerization, or other groups which would have a tendency to act as chain terminating or transfer agents. That is, the same criterion regarding active hydrogen applied to the vinyl monomers should be applied to the solvents.

CATALYSTS

The catalyst systems operable in this process are broadly those which promote the formation of dicarbanions. That is, they are capable of transferring an electron to a polymerizable monomer to form a monomer ion, which adds more monomer units and then combines with another ionized monomer radical to yield a molecule having two negatively charged ends or sites (a dicarbanion) on each end of which further propagation can take place. Thus, the metals of Group IA (lithium, sodium, potassium) used either alone or as complexes with such polycyclic aromatic compounds as naphthalene, phenanthrene, diphenyl, dinaphthyl, acenaphthene, methylnaphthalene and retene are especially effective in promoting polymerizations of this type.

The amount of catalyst employed depends primarily on the monomers to be used and the characteristics desired in the final polymer produced. In general, an increased amount of catalyst leads to the production of a lower molecular weight product, and vice versa.

REACTION CONDITIONS

With respect to temperature at which these copolymerizations are carried out, temperatures as low as −100° C. and as high as 100° C. may be employed in carrying out the polymerization. Preferably, the reactions are carried out at a temperature of about −80° C. to +10° C. The precise temperature of polymerization will depend to a ---
[1] As described in two articles by Zerewitinoff: Berichte, 40, 2023 (1907), and Berichte, 41, 2233 (1908); and in an article by Kohler in J. Am. Chem. Soc., 49, 3181 (1927).

large degree upon the particular reactivities of the monomers being reacted. Stability of the intermediate carbanion likewise is a consideration in selecting the best temperature for carrying out the reaction. The process is usually carried out under vacuum. For some systems, it may be desired to carry out the polymerizations at atmospheric pressure or above. In some instances an inert atmosphere such as argon may be used to advantage.

ISOCYANATE MONOMER

The preferred isocyanate monomer/vinyl monomer copolymer is characterized by the following structure:

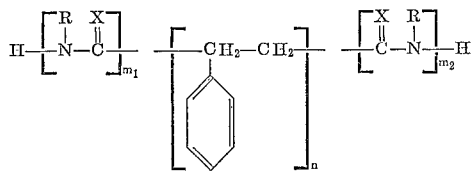

The isocyanate monomer should be used in a very pure condition and should be added to the polymerization system after polymerization of the vinyl monomer has occurred to the extent of at least 10 units as represented by $n$ in the typical formulae. The amount of isocyanate monomer used should be such that it represents at least 0.5 mole percent of the total monomer in the copolymer as represented by $m_1$ and $m_2$ in the typical formulae. Below this amount, it has been found that the advantages of the present invention are not achieved. It should be understood that different minima will apply depending upon the vinyl monomer or vinyl monomers used. Although there is no real maximum, it has been found that when the isocyanate monomer represents more than 80 mole percent of total monomer used, then the basic desirable properties of the polymer of the vinyl monomer are substantially lost. In some instances wherein properties more characteristic of the isocyanate polymer may be most desired, a higher proportion of the isocyanate monomer, for example up to 98 mole percent, may be incorporated.

As stated previously, the preferred copolymer is the block copolymer. Specifically, it is the block copolymer having at least one constituent incorporated singly as a central discrete segment, said constituent being a polymerized vinyl monomer (styrene, methyl methacrylate, acrylonitrile, isoprene, butadiene), said central segment having attached at each end at least one additional polymer segment of a polymerizable monomer devoid of carbon-to-carbon unsaturation (the isocyanate monomer.) It should be understood that other polymer segments, e.g. vinyl or non-vinyl, may be attached to the segments of polymerized isocyanate monomer. The block copolymers are prepared by the action of an electron transfer agent of the group of metals and metallo-organic complexes of Group IA of the Periodic Table.

It should be understood that the novel copolymers of this invention are useful in the preparation of films, filaments, rods, tubing, moldings, foamed structures, nets, non-woven fabrics and the like.

The films may be used for packaging or as laminates in the preparation of building materials or the like. The copolymers of the invention may be used as such. They may also contain dyes, fillers, pigments, plasticizers, etc.

The invention will be more fully understood by referring to the examples which follow.

*Example 1*

The apparatus for the polymerization consists of a vacuum train to which is attached the polymerization flask fitted with a glass covered magnetic stirring bar and tubes for admitting the catalyst solution, the solvent and the monomers. The equipment is so arranged that transfers of material to the reaction flask can be made through the closed system, out of contact with the exterior atmosphere. For convenience, the reaction system is operated under reduced pressure so that the liquid materials can be transferred by distillation. The catalyst solution is introduced from a dropping funnel fitted directly to the polymerization flask.

The reaction flask containing the stirrer is prepared for carrying out polymerization by first heating it in an oven at 140° C. overnight, then heating it in a flame under evacuation for three hours, then cooling it to −78° C. with a Dry Ice/acetone bath. There is then added 6 ml. of catalyst solution (about 0.001 molar sodium biphenyl in prepurified tetrahydrofurane). After standing for 25 minutes, 300 ml. of tetrahydrofurane is distilled into the solution and stirring is started. The color of the liquid in the reaction flask at this stage is blue-green and it shows no loss of intensity on standing, indicating that no catalyst deactivation is occurring. To this, 4.8 ml. of styrene is added by distillation under vacuum over a 6-minute interval while the temperature is held at −80° C.

The styrene had been purified by washing with 10% sodium hydroxide and then with water, then drying over magnesium sulfate, then distilling under nitrogen onto calcium hydride, then degassing under vacuum three times. The styrene so treated is distilled under reduced pressure. A center cut is distilled onto calcium hydride and, prior to use in the polymerization, 10% of this center cut is distilled off and discarded prior to use. Immediately upon the addition of styrene, the solution, which is stirred continuously throughout the experiment by a glass encased magnetic stirrer, becomes viscous and turns orange.

Thereafter, 3 ml. of n-butyl isocyanate is added to the polymerization flask under vacuo over a 5-minute period. As the n-butyl isocyanate is introduced, there is observed to be an increase in viscosity of the reaction solution and the color becomes lighter changing to yellow to colorless and finally becomes cloudy. The addition of the isocyanate is stopped when the solution becomes too viscous for good stirring and there is then added 0.25 ml. of degassed glacial acetic acid.

The reaction mixture is decanted into one liter of methanol with stirring and the resulting precipitate is collected by filtration and dried. Infrared absorption data indicate that the polymer precipitated from methanol contains about 70% styrene units. The polymer shows an inherent viscosity of 1.59 measured as a 0.5% solids solution in benzene at 30° C.

The films pressed from the copolymer product are tough and flexible in contrast to the stiff films pressed from a polystyrene control or from a control film of the isocyanate homopolymer. In a third control, 15 grams of anhydrous aluminum chloride, 100 grams of o-dichlorobenzene, and 6 grams of n-butyl isocyanate are charged to a reaction flask. At a temperature of 25–35° C. 104 grams of a 10 percent solution of polystyrene dissolved in o-dichlorobenzene is added at a uniform rate over a period of forty minutes. The temperature is then slowly raised to 75° C. over a period of forty-five minutes at which time the polymer solution becomes very viscous. The reaction mass is then mixed with an excess of ethyl alcohol to deactivate the catalyst and to remove all unreacted isocyanate. The polymer which was precipitated is found to be insoluble in benzene and acetone, and is found to have a softening point of 150° C. When pressed into a film, this product was found to be stiffer and less flexible than the films of the example.

*Examples 2–5*

These examples are carried out substantially as described in Example 1 using the relative molar amounts of vinyl monomer and isocyanate or isothiocyanate monomer shown in the table. The copolymer products are pressed into films and their properties are given in the table.

TABLE

| Example | Mole Percent Vinyl Monomer | Mole Percent Isocyanate or Isothiocyanate Monomer | Film Property |
|---|---|---|---|
| 2 | 85 Butadiene | 15 Methyl Isocyanate. | Higher tenacity and stiffer film than butadiene polymer control film. |
| 3 | 85 Acrylonitrile | 15 Decylisocyanate | Tough, flexible film. |
| 4 | 85 Methyl Methacrylate. | 15 Dodecylisothiocyanate. | Do. |
| 5 | 85 Isoprene | 15 n-Butyl Isothiocyanate. | Higher tenacity and stiffer film than isoprene polymer control film. |

Having fully disclosed the invention, what is claimed is:

1. A normally solid thermoplastic copolymer having at least one constituent incorporated singly as a non-recurring central discrete segment, said constituent being a polymerized vinyl monomer, said central segment being composed of at least 10 units of said vinyl monomer and having attached at each end at least one additional polymer segment of a cyanate monomer of the formula $$R-N=C=X$$

where R is selected from the group consisting of alkyl of 1 through 18 carbons, phenyl, biphenyl and alkylphenyl where the alkyl portion is of 1 through 18 carbons, and X is selected from the group consisting of oxygen and sulfur, said vinyl monomer being devoid of groups containing an active hydrogen atom as determined by the Zerewitinoff test, and said cyanate monomer constituting 0.5–98% of the sum of the moles of said copolymer.

2. A copolymer as in claim 1 wherein R is alkyl of 1 through 18 carbons and X is oxygen.

3. A copolymer as in claim 1 wherein R is n-butyl and X is oxygen.

4. A copolymer as in claim 1 wherein R is methyl and X is oxygen.

5. A copolymer as in claim 1 wherein R is decyl and X is oxygen.

6. A copolymer as in claim 1 wherein R is n-butyl and X is sulfur.

7. A copolymer as in claim 1 wherein R is dodecyl and X is sulfur.

8. A copolymer as in claim 1 wherein said vinyl monomer is styrene.

9. A copolymer as in claim 1 wherein said vinyl monomer is butadiene.

10. A copolymer as in claim 1 wherein said vinyl monomer is isoprene.

11. A copolymer as in claim 1 wherein said vinyl monomer is methyl methacrylate.

12. A copolymer as in claim 1 wherein said vinyl monomer is acrylonitrile.

13. A self-supporting film comprising a normally solid thermoplastic copolymer having at least one constituent incorporated singly as a non-recurring central discrete segment, said constituent being a polymerized vinyl monomer, said central segment being composed of at least 10 units of said vinyl monomer and having attached at each end at least one additional polymer segment of a cyanate monomer of the formula $R-N=C=X$ where R is selected from the group consisting of alkyl of 1 through 18 carbons, phenyl, biphenyl and alkylphenyl where the alkyl portion is of 1 through 18 carbons, and X is selected from the group consisting of oxygen and sulfur, said vinyl monomer being devoid of groups containing an active hydrogen atom as determined by the Zerewitinoff test, and said cyanate monomer constituting 0.5–98% of the sum of the moles of said copolymer.

References Cited by the Examiner

UNITED STATES PATENTS

| 2,335,582 | 11/1943 | Coffman | 260—77.5 |
| 2,468,713 | 4/1949 | Kropa et al. | 260—80 |
| 3,050,511 | 8/1962 | Szwarc | 260—93.5 |

FOREIGN PATENTS 1,006,615  4/1957  Germany.

JOSEPH L. SCHOFER, *Primary Examiner.*